Patented Nov. 30, 1926.

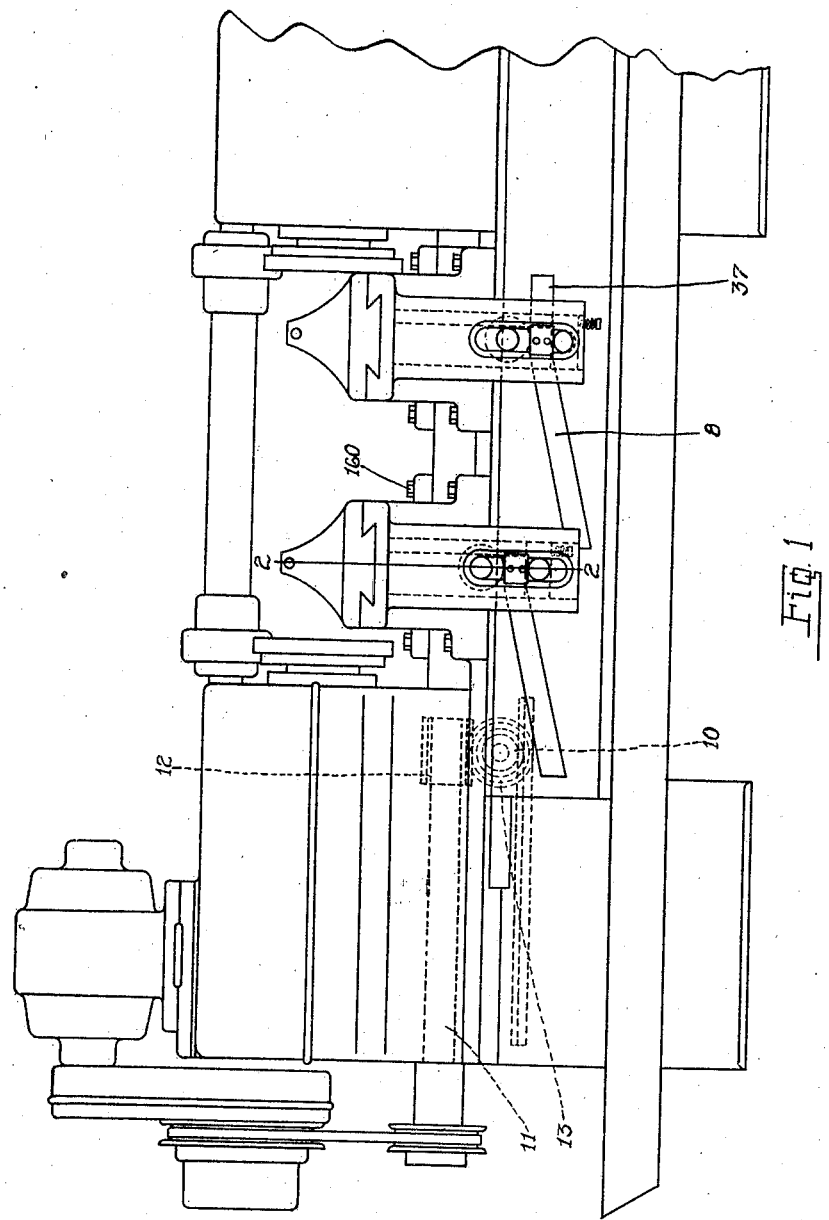

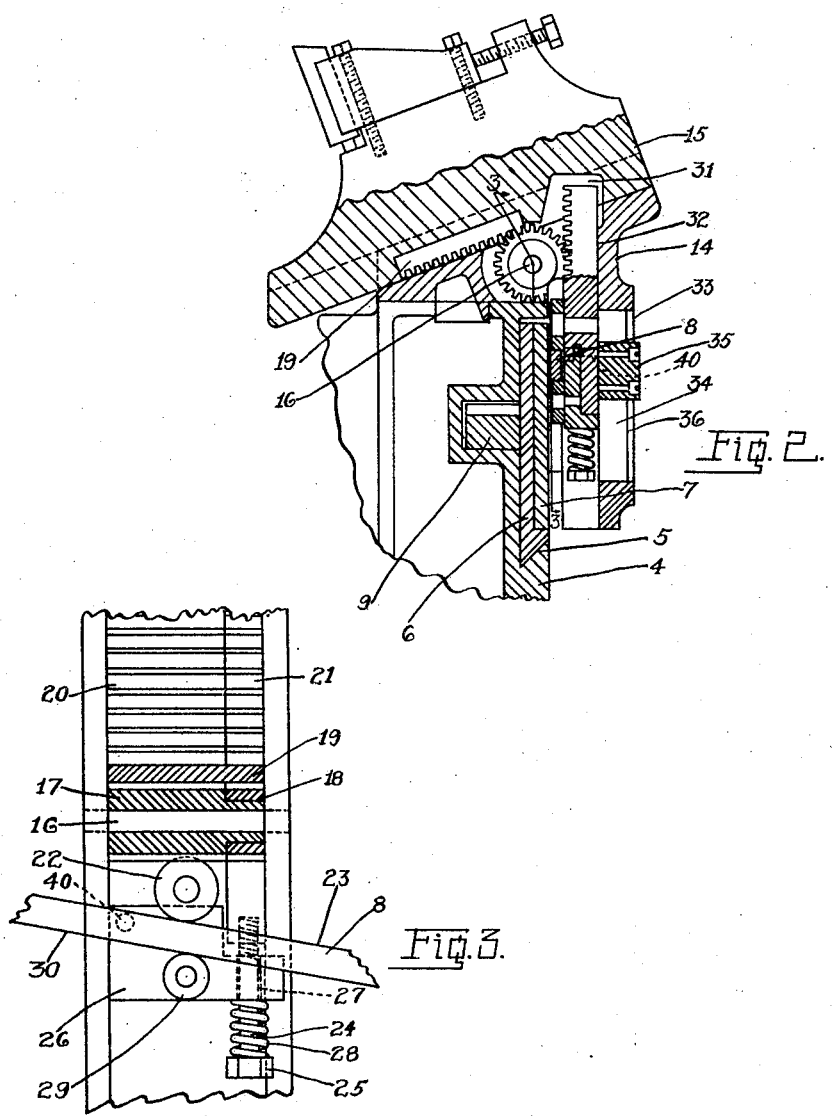

1,609,021

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

LATHE.

Application filed November 21, 1923. Serial No. 676,011.

An object of my invention is to provide a cross-feed for lathes and the like wherein wear is automatically compensated for and taken up in the operation of the device.

Another object of my invention is to provide a simple and efficient device for the purpose stated.

These and other objects are attained by the means described herein, and disclosed in the accompanying drawings, in which:

Fig. 1 is a fragmental front elevation of a lathe having mounted upon it a device embodying my invention.

Fig. 2 is an enlarged sectional view on line 2—2 of Fig. 1.

Fig. 3 is an enlarged sectional view on line 3—3 of Fig. 2.

The lathe may be of any suitable structure. As disclosed herein the lathe bed 4 is provided with a longitudinally extending way 5 in which is reciprocally contained a carriage 6 upon which carriage is fixedly mounted a cam plate 7 carrying cam bars 8. The number of cam bars may be modified and similar structures for providing reciprocating cam bars may be provided at the front and at the rear of the lathe bed. The carriage 6 may be reciprocated longitudinally of the bed in any suitable manner such as by means of a rack 9 associated with the carriage and operated upon by a pinion 10 driven from a shaft 11 by any suitable means such as a worm 12 and worm wheel 13. The lathe bed has mounted on it a tool support base 14 on which is reciprocally mounted a tool holder or tool support 15. The base 14 may be moved longitudinally of the lathe bed and may be fixedly secured in adjusted positions longitudinally of the bed. Any suitable means such as the bolts 160 may be used for this purpose. The base 14 carries a shaft 16 on which are rotatably mounted spaced pinions 17 and 18. The tool slide 15 is provided on its under face with a rack 19 that engages both pinions 17 and 18. A pair of vertical reciprocating racks 20 and 21 engage the pinions 17 and 18 respectively. The rack 20 carries a roller 22 that engages the upper face 23 of the cam bar 8. The rack 21 carries at its lower end a rod 24 having a head 25. A link 26 is pivotally mounted at 40 on the lower end of the rack 20 and is provided with a bore 27 through which the rod 24 extends. A spring 28 has its opposite ends in abutment upon the head 25 of the rod and the link 26. A roller 29 carried by the link engages the under face 30 of the cam bar 8. The faces 23 and 30 of the cam bar are parallel. Any suitable means may be provided for guiding the racks vertically for example as shown herein the base 14 is provided with a recess 31 into which the vertical racks may move, and the wall 32 of said recess serves as a bearing over which the racks move. The base is provided with a depending apron 33 through which is formed an elongated aperture 34. A block 35 carried by the lower end of the rack 20 is reciprocally contained within the aperture 34 thereby serving to guide the racks vertically. It should be noted that a ledge 36 is provided in the aperture adjacent the outer portion thereof and that this ledge serves as a bearing for the block 35. By reference to Fig. 2 it will be apparent that the link and the lower end of the rack 20 are so fitted in relation to one another that the block serves to guide the link as well as the racks.

The cam bars 8 are provided at their ends with dwells 37 whereby the movement of the tool holder may be rested although the carriage continues to move longitudinally of the lathe bed. This structure permits arresting of determinable tool holders while other tool holders may be fed further for continuing their work. The dwells are accomplished by extending the opposed faces 23 and 30 of the cam bar 8 in parallelism with the line of movement of the carriage, wherefore as the rollers 22 and 29 move over said dwells, the further movement of the tool holder is checked or arrested.

In the operation of my device the movement of the carriage 6 longitudinally of the lathe bed serves to move the cam bars through and between the rollers 22 and 29. This movement of the rollers is transmitted to the racks 20 and 21 and the pinions 17 and 18 are rotatably actuated. The rotation of the pinions 17 and 18 serves to actuate the tool holder 15 longitudinally of the ways provided in the base 14, which ways extend substantially transversely of the lathe bed. The spring 28 yieldingly resists upward movement of the rack 21 wherefore the effect of the engagement of the rack 21 upon the pinion 18 and of pinion 18 upon rack 19 is to eliminate any play that may exist between rack 20 and pinion 17, and pinion 17 and rack 19, wherefore the movement of the roller 22 by the cam bar 8 will effect a positive accurate feeding of the tool holder 15 without likelihood of inaccuracies developing in the work because of play between said last mentioned tool holder actuating means. The pivot 40 serves as the fulcrum for the link 26.

What I claim is:

1. In a device of the class described the combination of a reciprocally mounted tool holder provided with a rack, a pair of pinions engaging the rack, a pair of racks each engaging one of said pinions, a cam, means for actuating said pair of racks from the cam, and yielding means associated with said racks for retaining the actuating means in engagement upon the cam.

2. In a device of the class described the combination with a reciprocating tool holder, a reciprocating slide cam having opposed parallel camming faces, a rack associated with the tool holder, a pair of pinions engaging the rack, a pair of racks each engaging one of the pinions, a roller carried by one of the racks engaging one of the camming faces, a link pivotally connected with said last mentioned rack, a roller carried by the link engaging a second cam face, and a yielding connection between the link and the second rack of the pair of racks.

3. In a device of the class described the combination with a lathe bed having a longitudinally extending way formed therein, a carriage reciprocally mounted in the way, a tool holder base fixedly mounted on the bed, a tool holder reciprocally mounted on the tool holder base and having a rack associated therewith, a pair of revolubly mounted pinions carried by the base engaging the rack, a pair of racks each engaging one of the pinions, means yieldingly moving the pair of racks in opposite directions, a cam carried by the carriage having opposed parallel faces and means associated with the racks for engaging the opposed faces of the cam for controlling the movement of the racks.

4. In a device of the class described the combination with a lathe bed having a longitudinally extending way formed therein, a carriage reciprocally mounted in the way, a tool holder base fixedly mounted on the bed, a tool holder reciprocally mounted on the tool holder base and having a rack associated therewith, a pair of revolubly mounted pinions carried by the base engaging one of the pinions, means yieldingly moving the pair of racks in opposite directions, a cam carried by the carriage having opposed parallel faces the opposed faces extending in part in parallelism with the longitudinal way in the lathe bed, and means associated with the racks for engaging the opposed faces of the cam for controlling the movement of the racks.

5. In a device of the class described the combination of a lathe bed having a longitudinally extending way formed therein, a reciprocating carriage in the way, a tool holder base for fixation on the base and having a perforated depending apron extending over the carriage, a pair of pinions rotatably supported by the base, a tool holder reciprocally mounted on the base and having a rack associated with it, the rack engaging the pair of pinions, a pair of racks each engaging a pinion and extending between the carriage and the depending apron on the base, a cam associated with the carriage and having opposed parallel faces, means associated with the pair of racks for engaging the opposed cam faces, means yieldingly retaining said last mentioned means in engagement upon the said opposed faces and a block associated with the racks extending into the perforation in the apron for guiding the racks.

6. In a device of the class described the combination of a lathe bed having a longitudinally extending way formed therein, a reciprocating carriage in the way, a tool holder base for fixation on the base and having a perforated depending apron extending over the carriage, a pair of pinions rotatably supported by the base, a tool holder reciprocally mounted on the base and having a rack associated with it, the rack engaging the pair of pinions, a pair of racks each engaging a pinion and extending between the carriage and the depending apron on the base, a cam associated with the carriage and having opposed parallel faces, said cam faces extending in part in parallelism with the way in the lathe bed, means associated with the pair of racks for engaging the opposed cam faces, means yieldingly retaining said last mentioned means in engagement upon the said opposed faces and a block associated with the racks extending into the perforation in the apron for guiding the racks.

7. In a device of the class described the combination of a reciprocating tool holder provided with a rack, a pair of pinions engaging the rack, a pair of racks each engaging one of said pinions, and means for reciprocating the pair of racks, the last mentioned means and the pair of racks being associated for permitting compensatory adjustment of the pinions upon the rack on the tool holder.

In testimony whereof, I have hereunto subscribed my name this 6th day of November, 1923.

WILLIAM F. GROENE.